United States Patent
Schmidt et al.

(10) Patent No.: US 11,292,560 B2
(45) Date of Patent: Apr. 5, 2022

(54) MULTIPLE MARINE VESSELS EMPLOYING SPATIAL CONTROL TO REDUCE WAVE-MAKING RESISTANCE

(71) Applicants: Terrence W. Schmidt, Santa Clara, CA (US); Jeffrey E. Kline, Severna Park, MD (US)

(72) Inventors: Terrence W. Schmidt, Santa Clara, CA (US); Jeffrey E. Kline, Severna Park, MD (US)

( * ) Notice: Subject to any disclaimer, the term of this patent is extended or adjusted under 35 U.S.C. 154(b) by 0 days.

(21) Appl. No.: 16/988,668

(22) Filed: Aug. 9, 2020

(65) Prior Publication Data

US 2021/0078682 A1 Mar. 18, 2021

Related U.S. Application Data

(60) Provisional application No. 62/899,894, filed on Sep. 13, 2019.

(51) Int. Cl.
| | |
|---|---|
| *B63B 79/40* | (2020.01) |
| *B63B 79/10* | (2020.01) |
| *G01S 19/42* | (2010.01) |
| *G05D 1/00* | (2006.01) |
| *B63B 79/20* | (2020.01) |
| *G05D 1/02* | (2020.01) |
| *G01C 21/20* | (2006.01) |

(52) U.S. Cl.
CPC .............. *B63B 79/40* (2020.01); *B63B 79/10* (2020.01); *B63B 79/20* (2020.01); *G01C 21/203* (2013.01); *G01S 19/42* (2013.01); *G05D 1/0011* (2013.01); *G05D 1/0088* (2013.01); *G05D 1/0206* (2013.01)

(58) Field of Classification Search
CPC ......... B63B 79/40; B63B 79/10; B63B 79/20; B63B 79/00; G01C 21/203; G01S 19/42; G05D 1/0011; G05D 1/0088; G05D 1/0206; G05D 1/0027; Y02T 70/00
See application file for complete search history.

(56) References Cited

U.S. PATENT DOCUMENTS

| | | | | |
|---|---|---|---|---|
| 8,437,509 | B1 * | 5/2013 | Hallenborg | G06K 9/0063 382/107 |
| 10,921,809 | B2 * | 2/2021 | Berg | G05D 1/0206 |
| 2010/0320759 | A1 * | 12/2010 | Lightfoot | F03B 13/20 290/42 |
| 2016/0147223 | A1 * | 5/2016 | Edwards | B63C 7/003 701/2 |
| 2018/0105236 | A1 * | 4/2018 | Bhageria | G05D 1/0206 |
| 2020/0333781 | A1 * | 10/2020 | Clarke | G05D 1/0027 |

* cited by examiner

*Primary Examiner* — Alan D Hutchinson
(74) *Attorney, Agent, or Firm* — Renner, Otto, Boisselle & Sklar, LLP

(57) ABSTRACT

A supervisory propulsion controller module, a speed and position sensing system, and a communication system that are incorporated on marine vessels to reduce the wave-making resistance of the multiple vessels by operating them in controlled and coordinated spatial patterns to destructively cancel their Kelvin wake transverse or divergent wave system through active control of the vessels separation distance with speed. This will enable improvement in the vessel's mobility (speed, payload and range), improve survivability and reliability and reduce acquisition and total ownership cost.

20 Claims, 17 Drawing Sheets

Transverse wave cancellation for marine vessels operating in tandem at the primary hump, and "sweet spot" speeds.

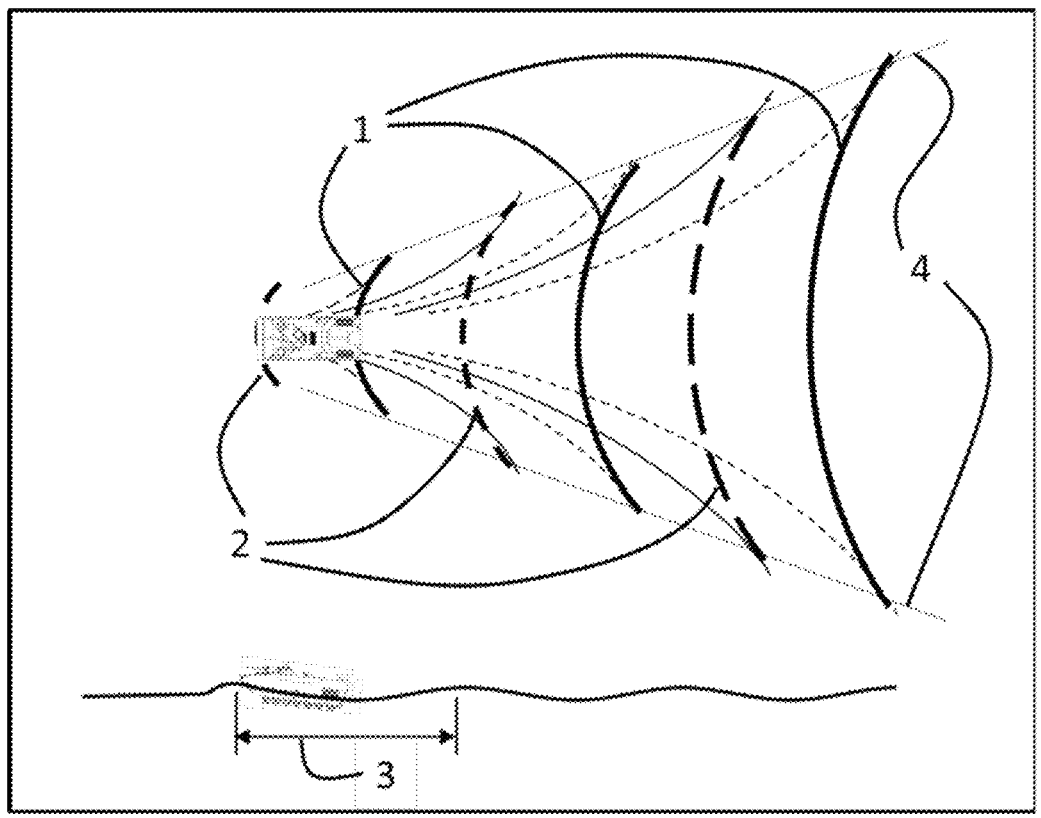
Figure 1. Kelvin wake for a marine vessel operating at hump speed (amphibious vehicle shown as example)

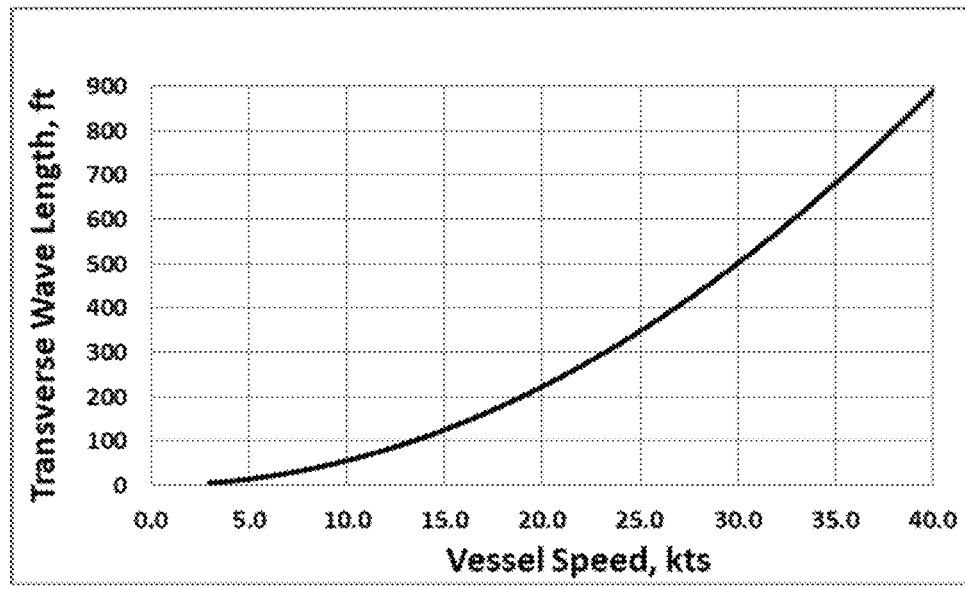
Figure 2. Kelvin Wake Transverse Wave Length vs. Vessel Speed (Independent of vessel size)
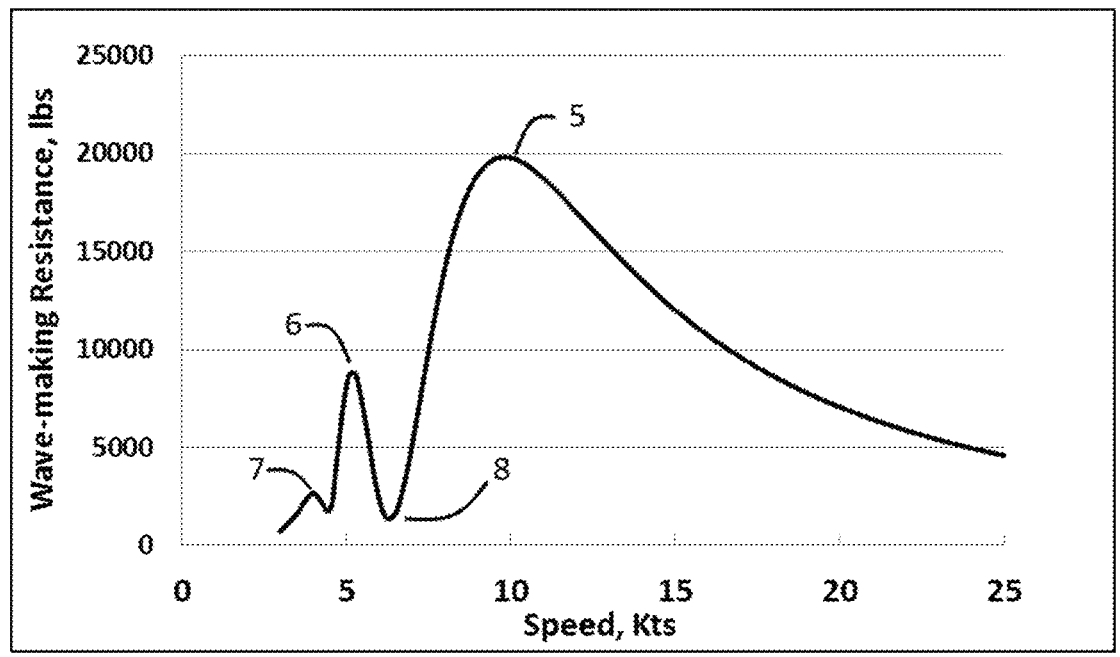
Figure 3. Wave-making resistance vs. speed for a marine vessel (amphibious vehicle shown as an example)

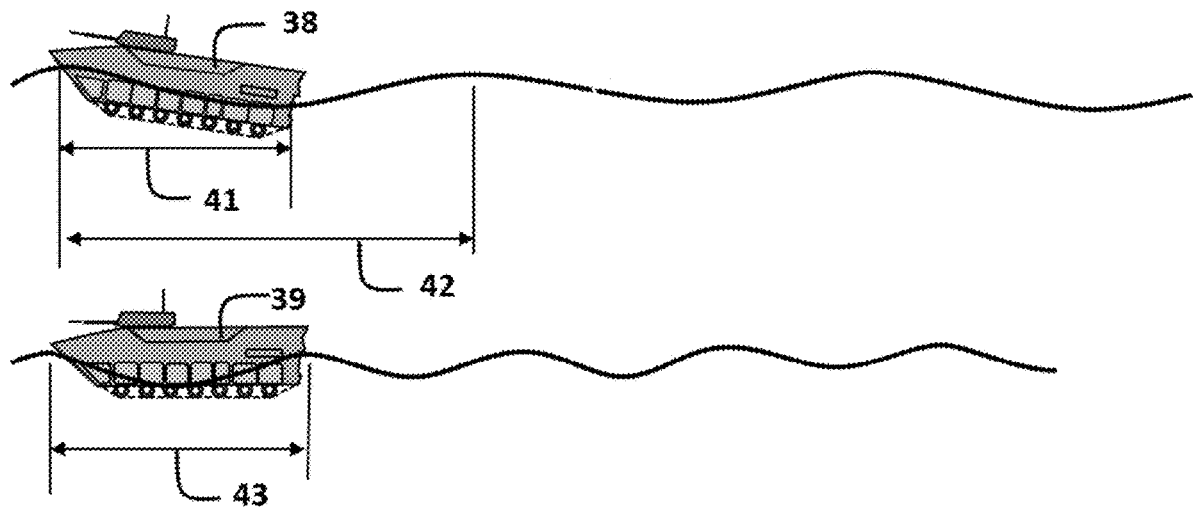
Figure 4. Elevation view showing the transverse wave for a single marine vehicle operating at its primary hump speed, and at its "sweet spot.
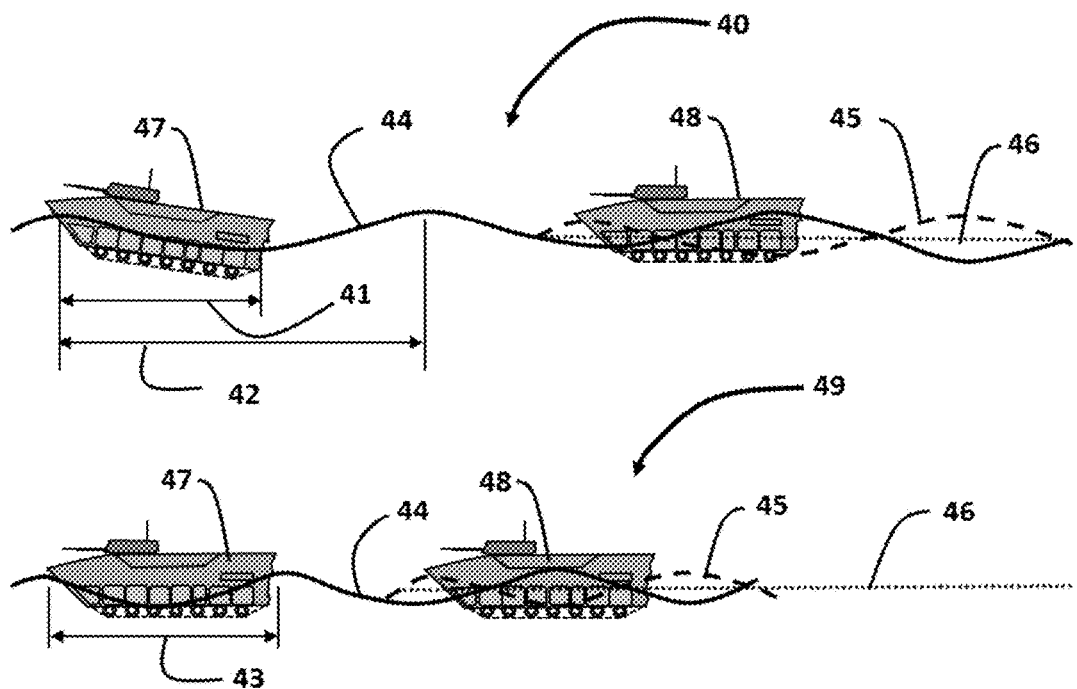
Figure 5. Transverse wave cancellation for marine vessels operating in tandem at the primary hump, and "sweet spot" speeds.

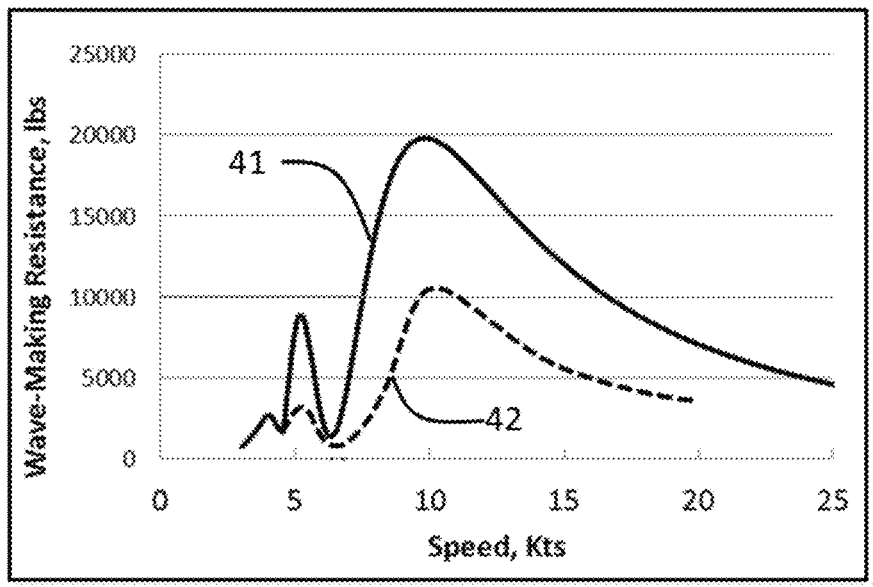
Figure 6. Wave-making resistance for tandem marine vessels as compared to a single marine vessel (amphibious vehicles shown as example).
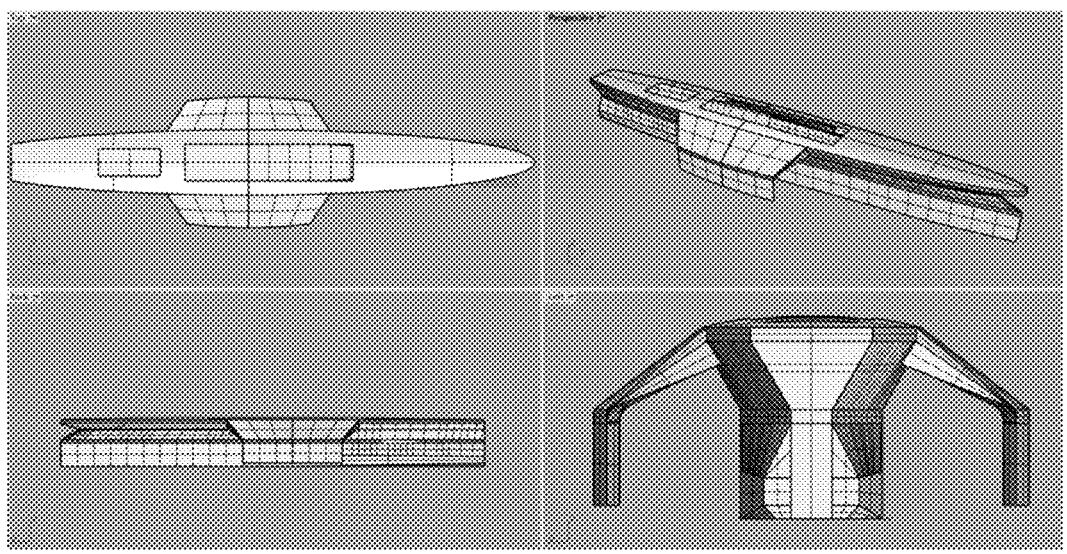
Figure 7. 130 ft Trimaran hullform

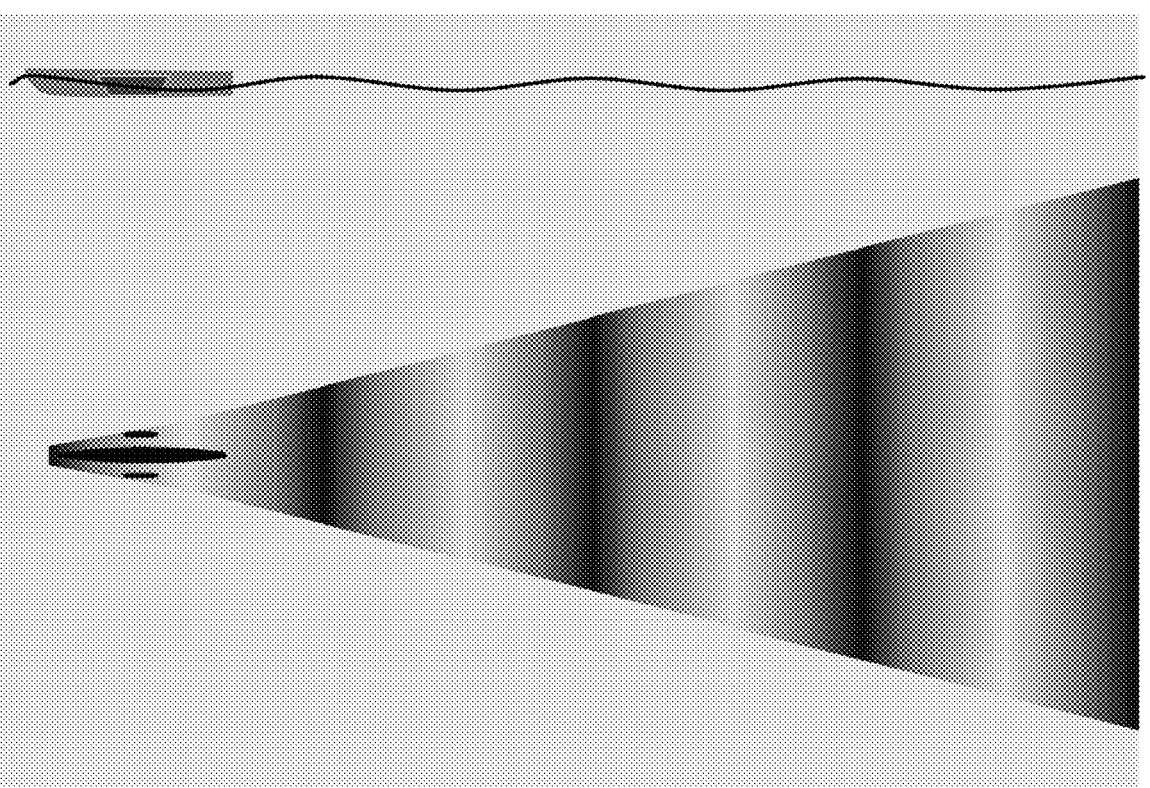
Figure 8. Kelvin wake transverse waves for Trimaran at 16 kt vessel speed
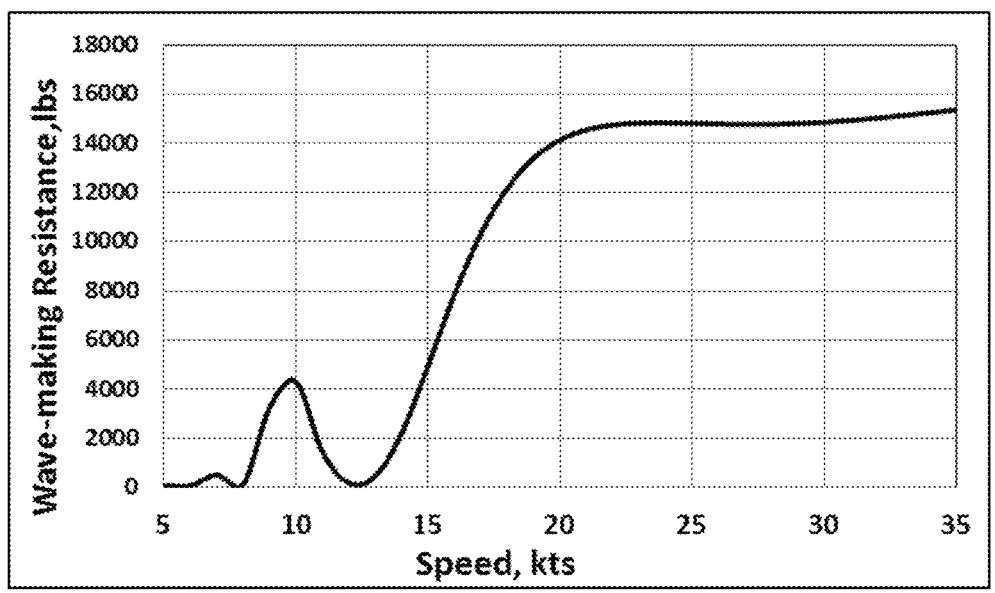
Figure 9. Trimaran wave-making resistance vs. speed

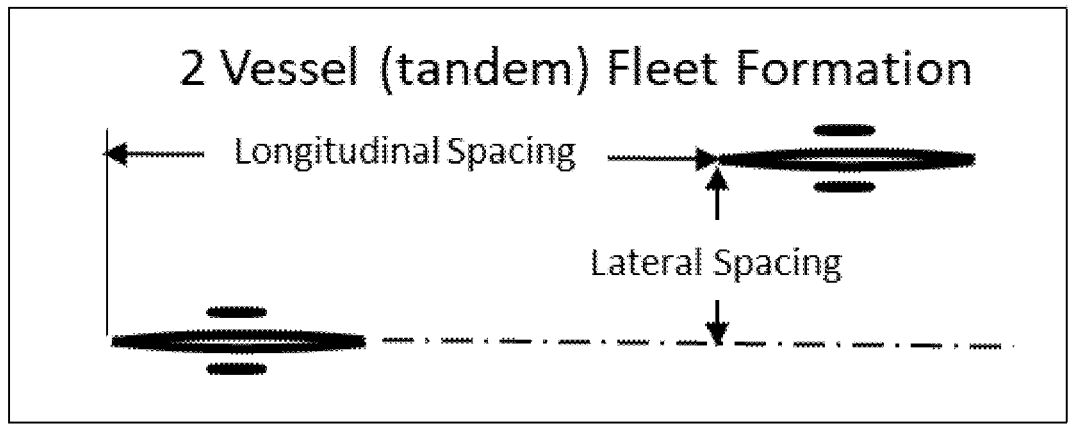
Figure 10. 2 vessel spatial arrangement; longitudinal and lateral spacing
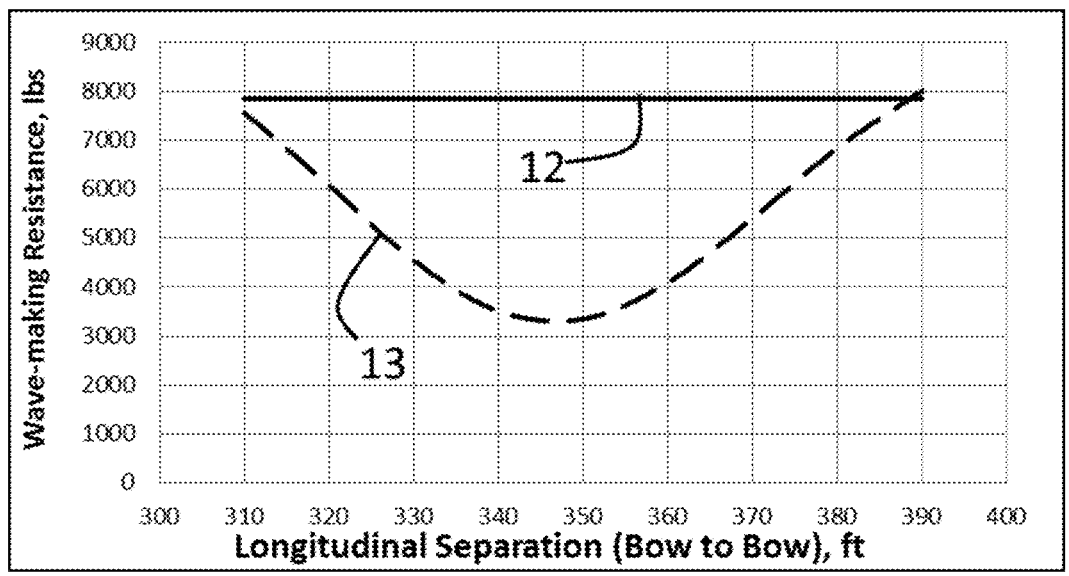
Figure 11. Effect of longitudinal separation on wave making resistance for a 2 vessel fleet formation at 16 kts

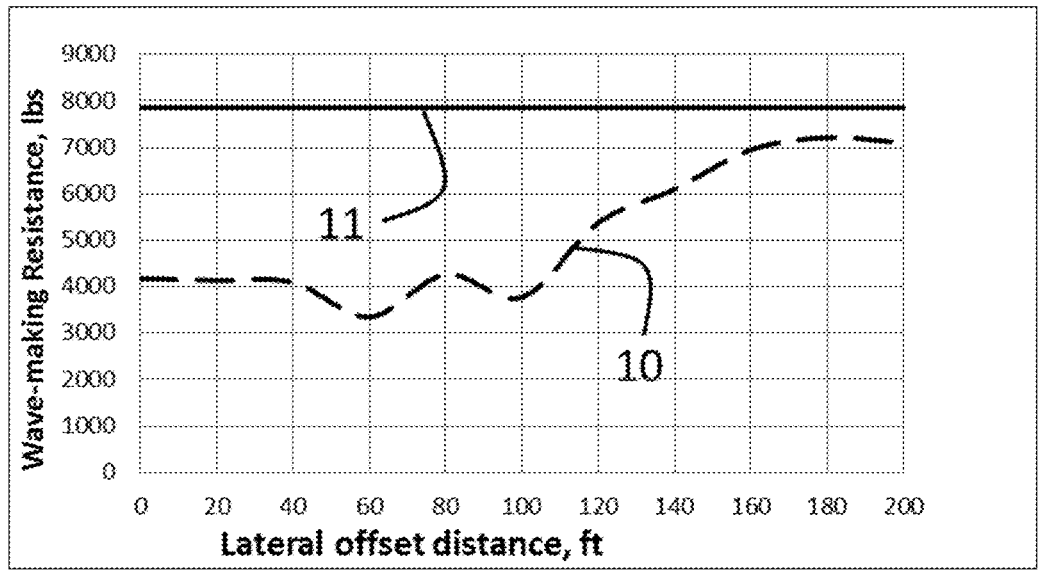
Figure 12. Effect of lateral separation on wave making resistance for a 2 vessel fleet formation at 16 kts
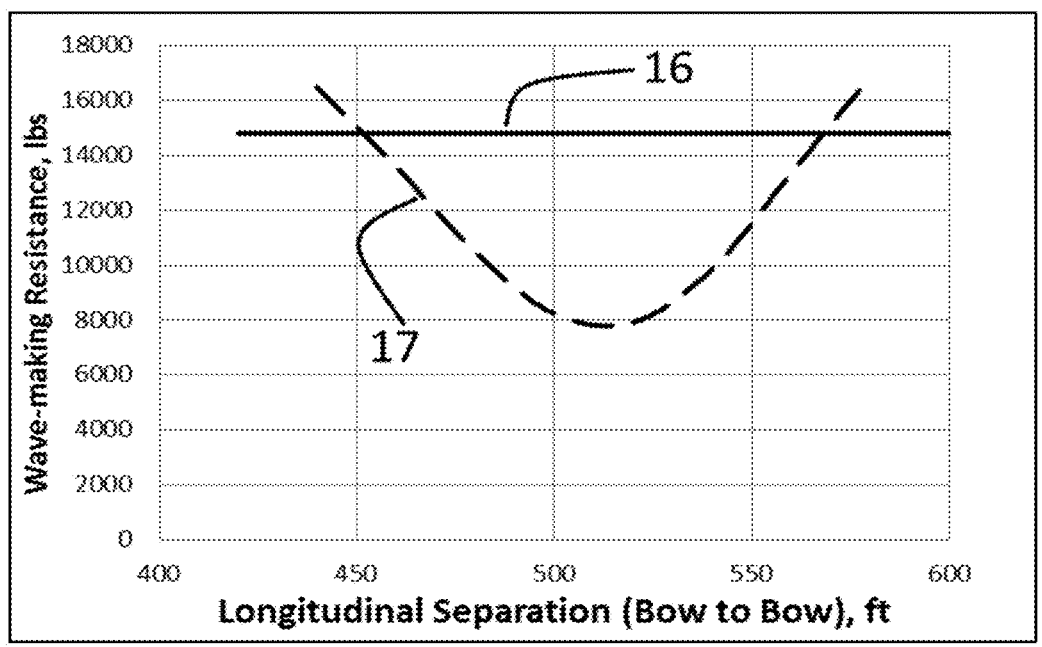
Figure 13. Effect of longitudinal separation on wave making resistance for a 2 vessel fleet formation at 25 kts

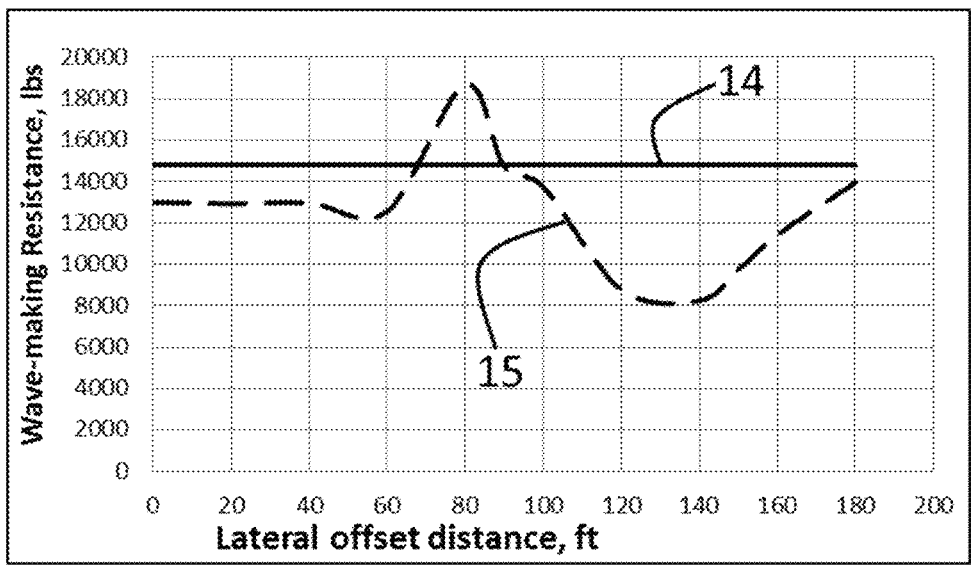
Figure 14. Effect of lateral separation on wave making resistance for a 2 vessel fleet formation at 25 kts
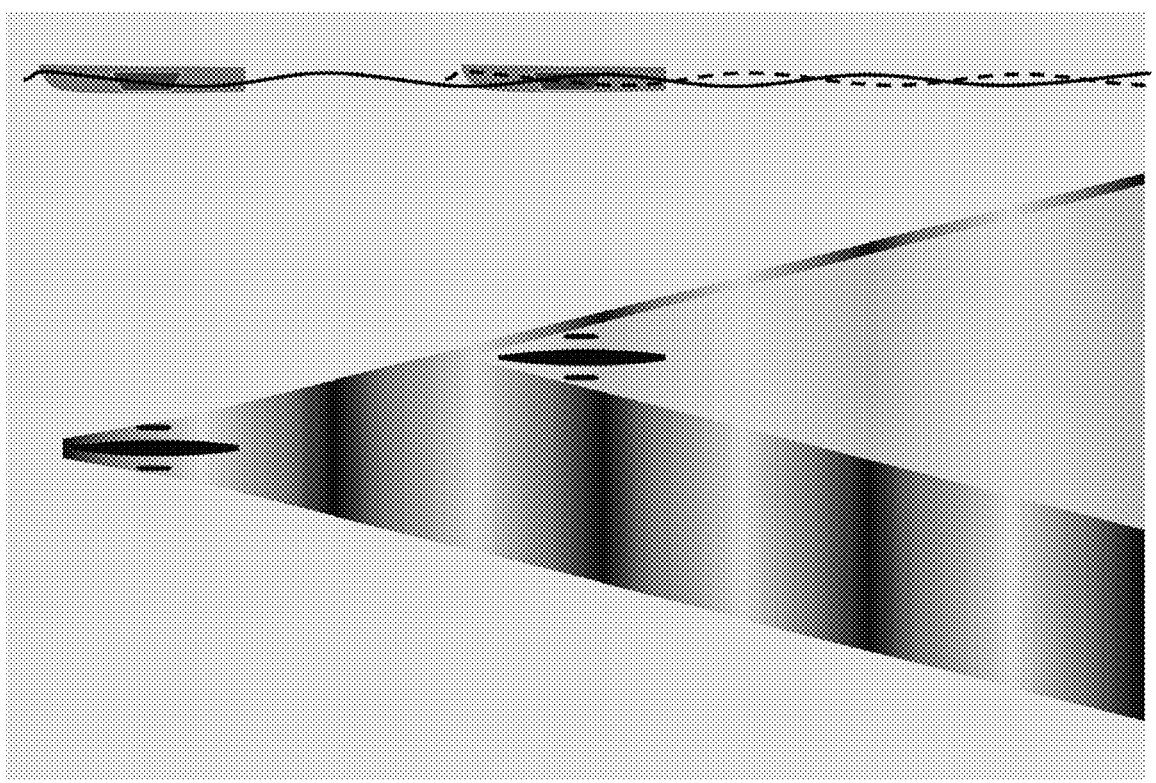
Figure 15. A 2 vessel fleet formation operating at 16 kts illustrating the Kelvin wake transverse wave cancellation and the resultant reduction in wave-making resistance

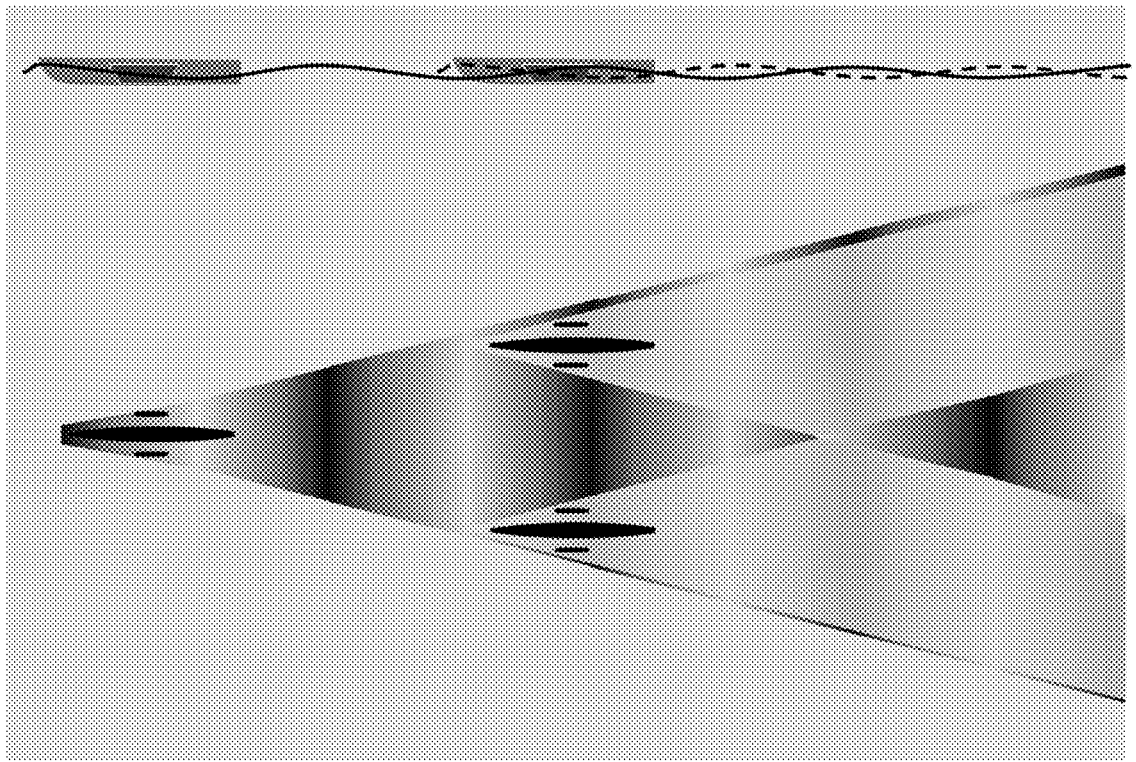
Figure 16. A 3 vessel fleet formation operating at 16 kts illustrating the Kelvin wake transverse wave cancellation and resultant reduction in wave-making resistance

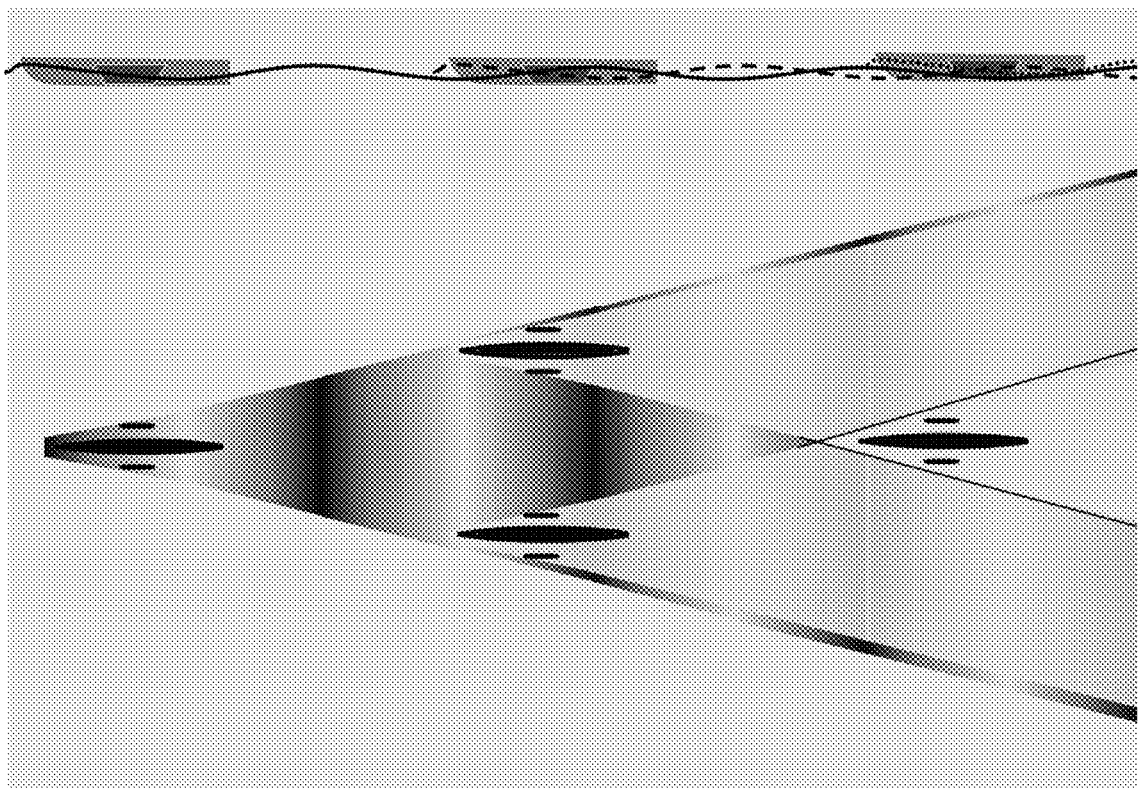
Figure 17. A 4 vessel fleet formation operating at 16 kts illustrating the Kelvin wake transverse wave cancellation and the resultant reduction in wave-making resistance

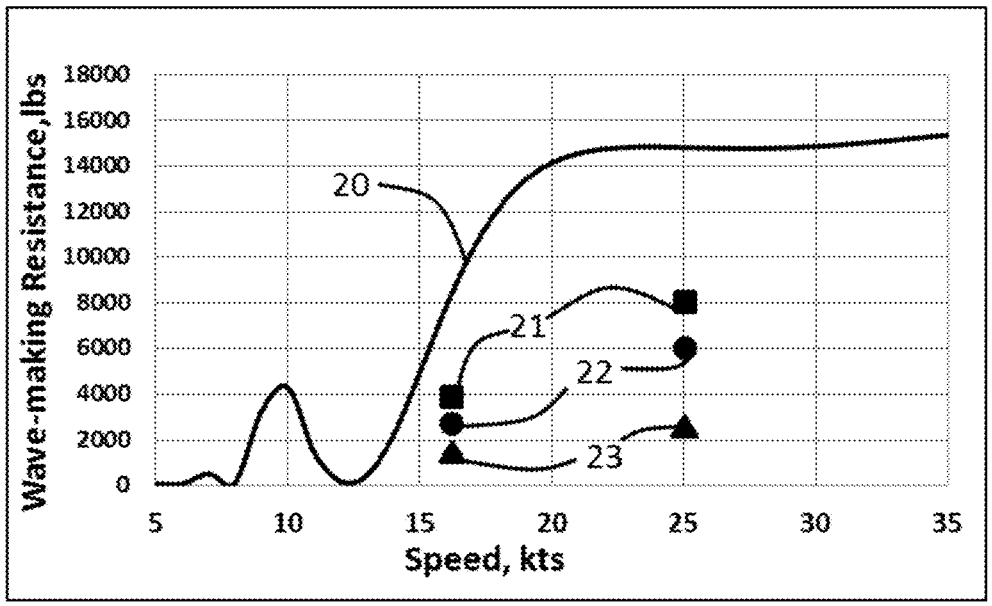
Figure 18. Wave-making resistance for 2, 3 and 4 vessel fleets at 16 and 25 kts compared to a single vessel's wave-making resistance.
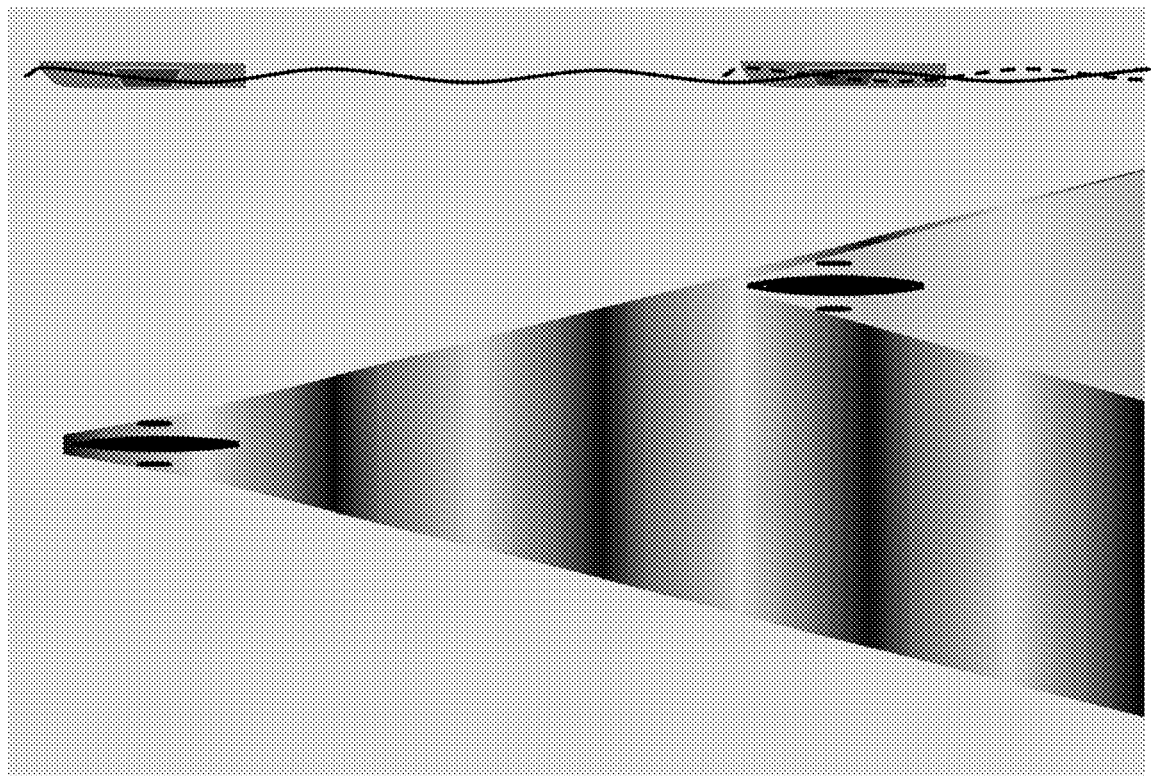
Figure 19. A 2 vessel fleet formation operating at 16 kts where the following vessel is longitudinally spaced at 2 ½ transverse wave lengths illustrating the Kelvin wake transverse wave cancellation.

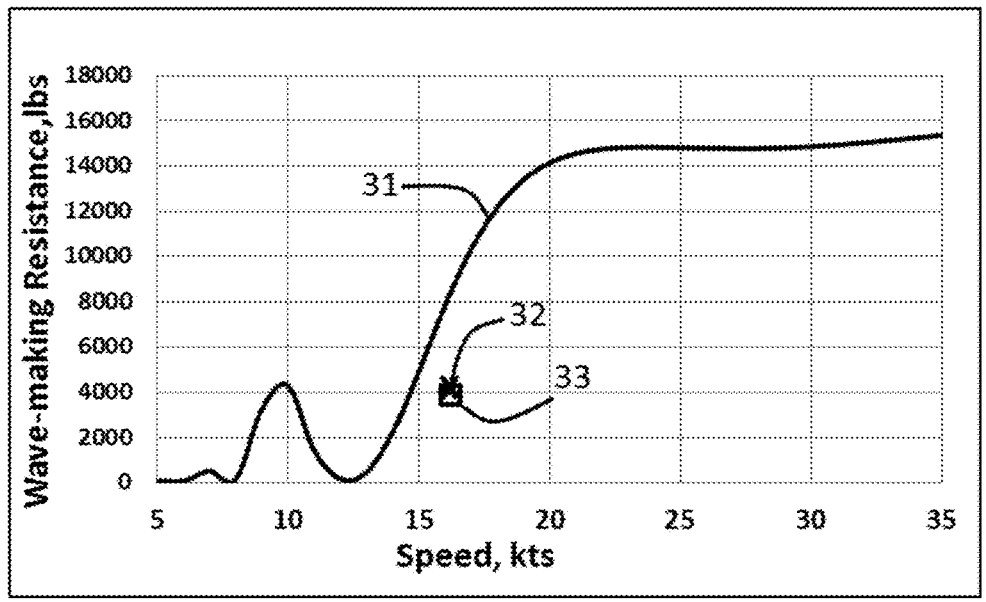
Figure 20. Comparison of reduction in wave-making resistance for a 2 vessel fleet with vessels' longitudinal spacing of 1 ½ and 2 ½ transverse waves
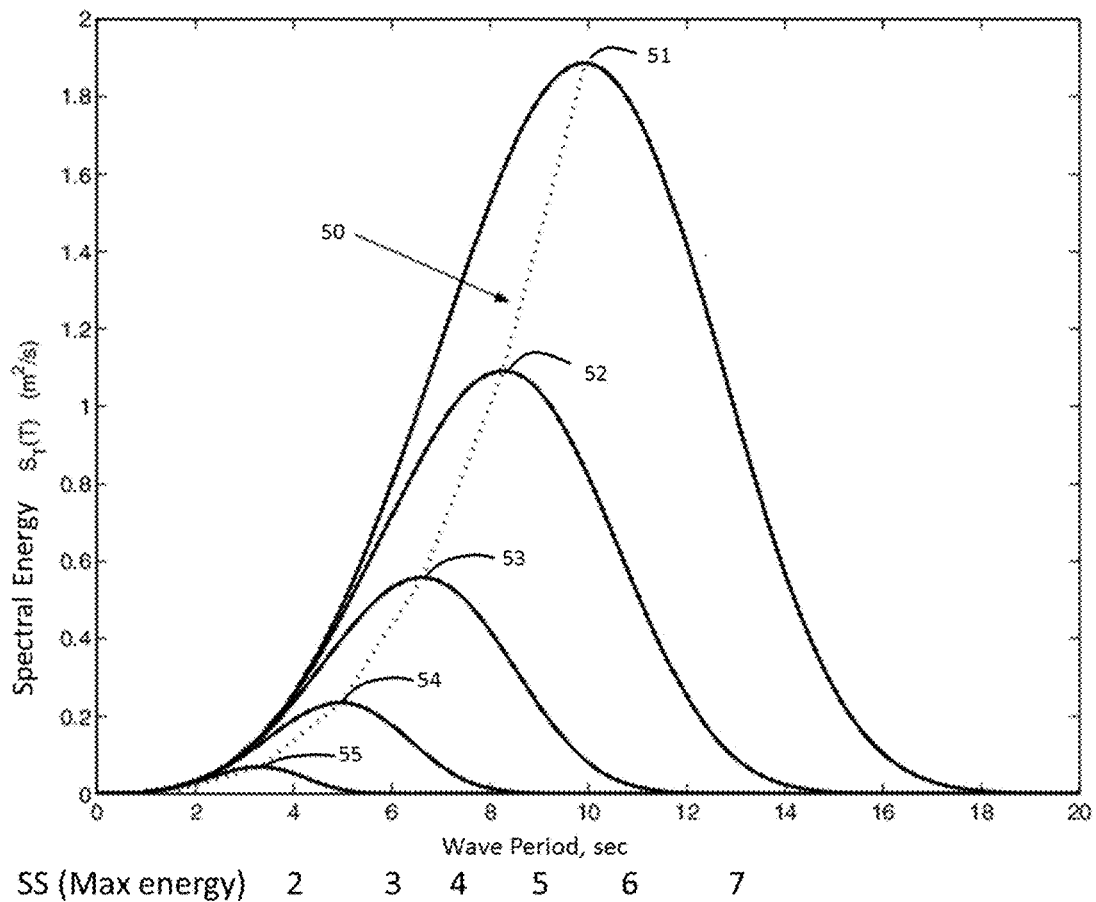
Figure 21. Seaway spectral energy distribution showing wave lengths and celerity speeds at the wave period where the maximum sea state energy occurs

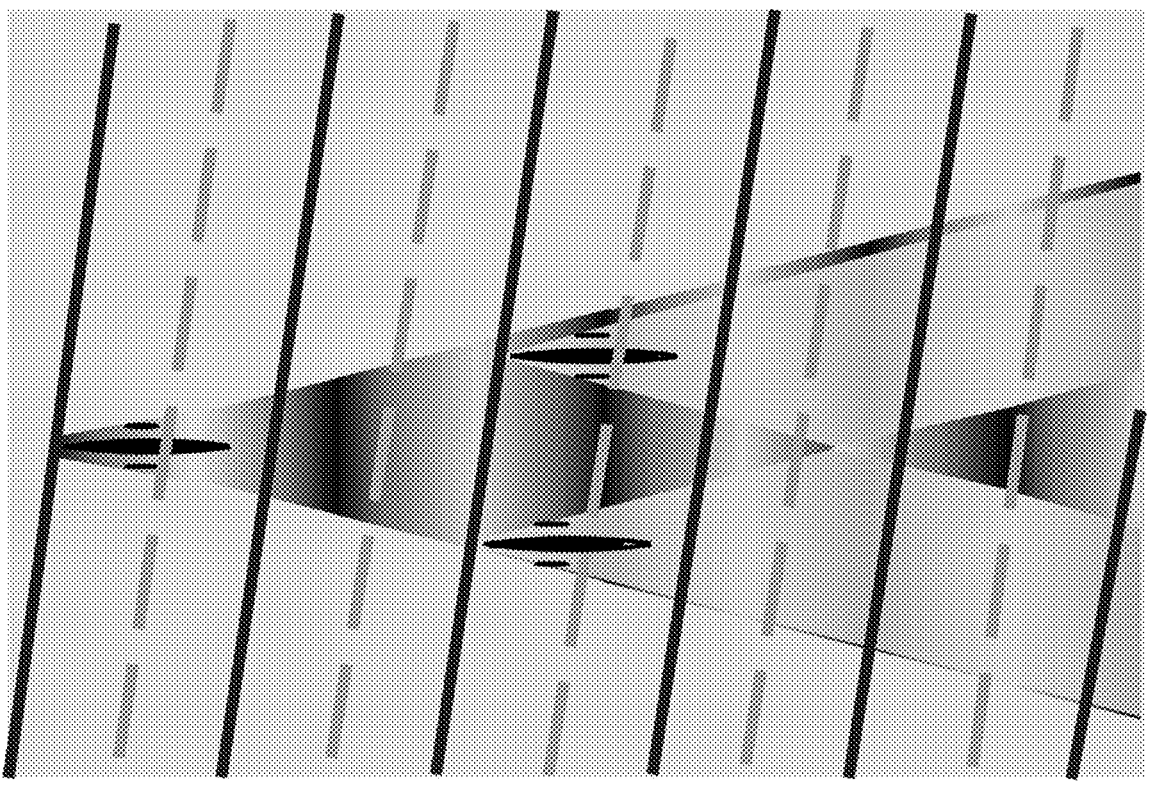
Figure 22. A 3 vessel fleet operating at 16 kts, in sea state 3, in a head (or following) seaway. The seaway predominant energy wavelength is shown. Vessels longitudinal spacing is 1 1/2 transverse waves.

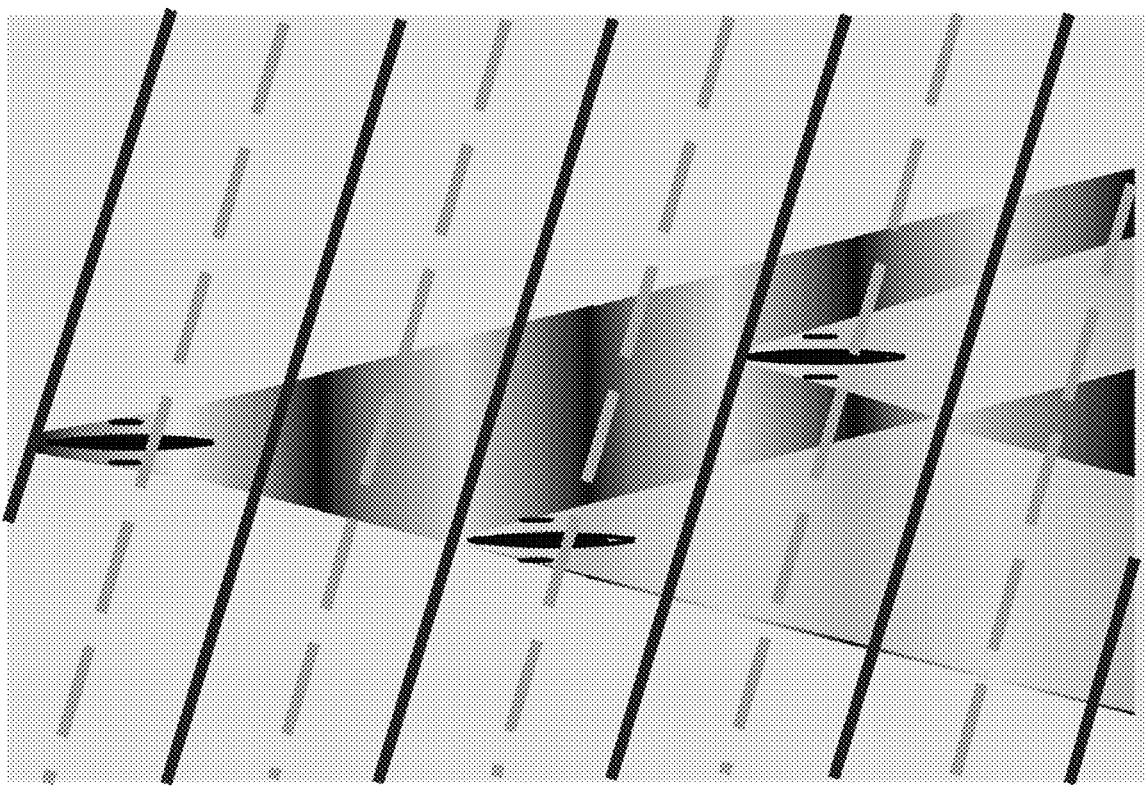
Figure 23. A 3 vessel fleet operating at 16 kts, in sea state 3, at a heading of 20 or 200 degrees to the seaway. The seaway predominant energy wave length is shown. The two following vessels are spatially positioned at 1 1/2 & 2 1/2 transverse waves aft of the lead vessel.

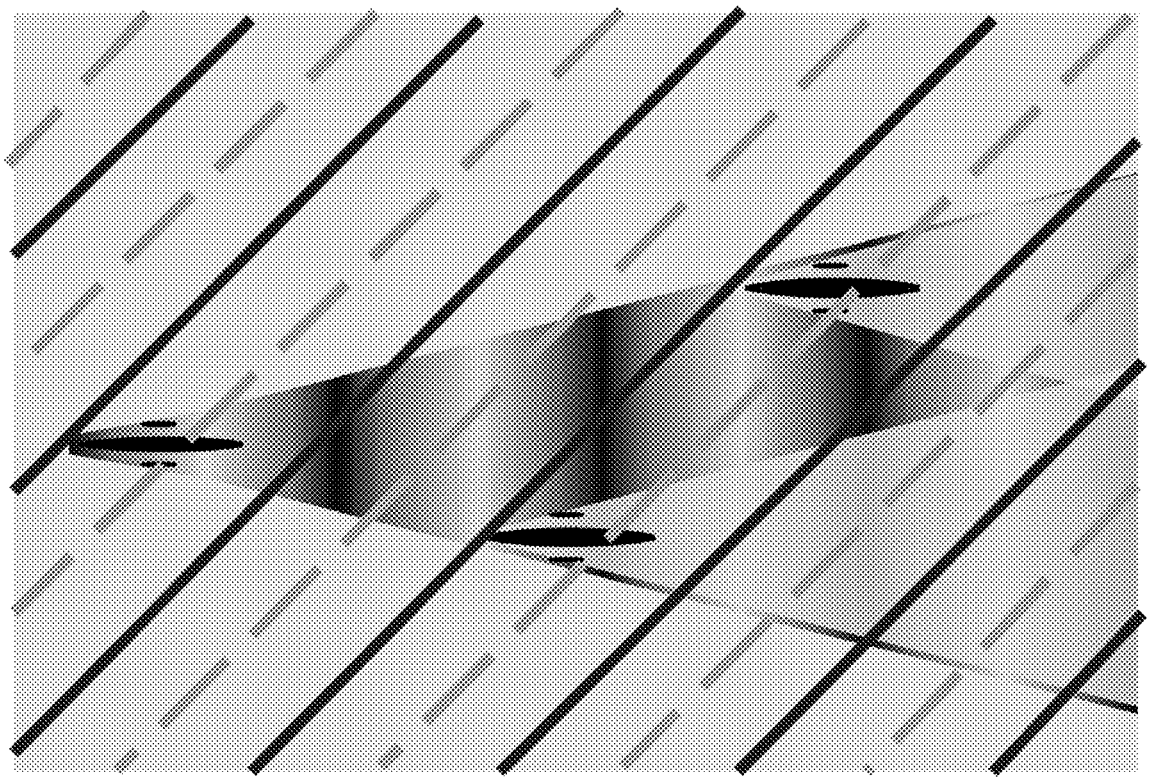
Figure 24. A 3 vessel fleet operating at 16 kts, in sea state 3, in bow or stern quartering seas. The seaway predominant energy wave length is shown. The two following vessels are spatially positioned at 1 1/2 & 2 1/2 transverse waves aft of the lead vessel.

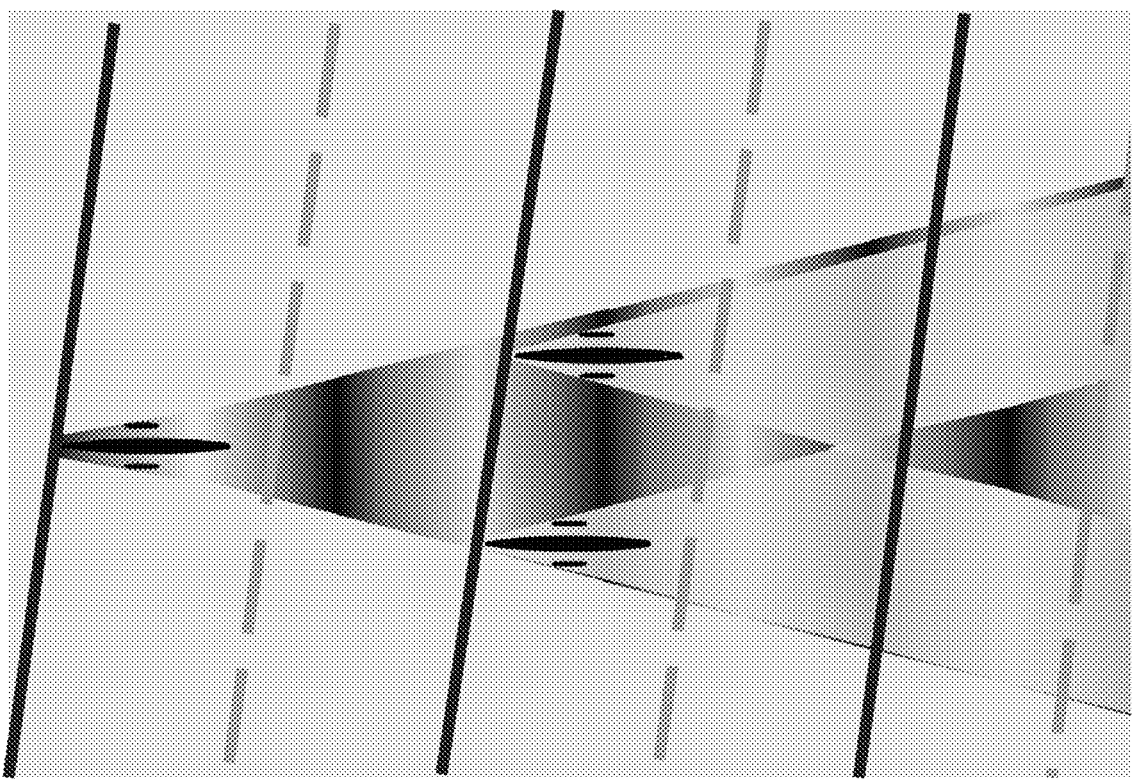
Figure 25. A 3 vessel fleet operating in sea state 4+ at 16 kts in a head (or following) seaway. The seaway predominant energy wave length is shown. Vessels longitudinal spacing 1 1/2 transverse waves,

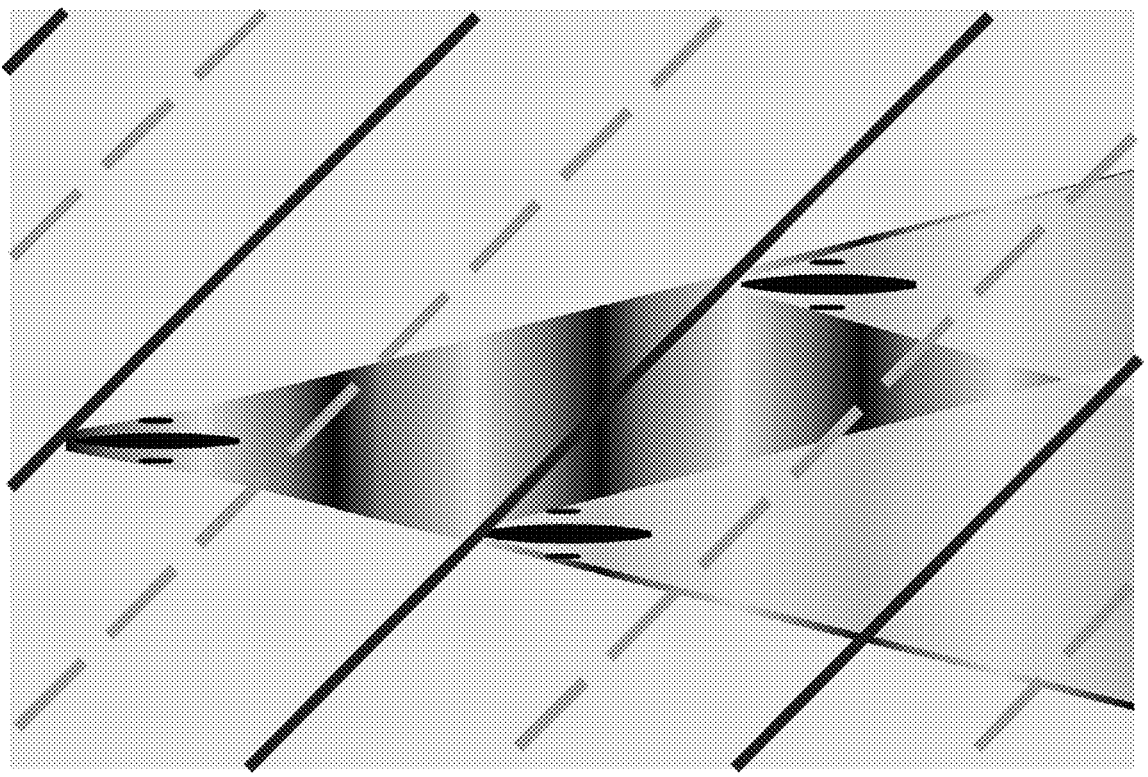
Figure 26. A 3 vessel fleet operating at 16 kts in sea state 4+ in bow or stern quartering seas. The seaway predominant energy wave length is shown. Vessels longitudinal spacing are 1 1/2 and 2 1/2 transverse waves.

MULTIPLE MARINE VESSELS EMPLOYING SPATIAL CONTROL TO REDUCE WAVE-MAKING RESISTANCE

CROSS REFERENCES TO RELATED APPLICATIONS

None

FEDERALLY SPONSORED RESEARCH

None

FIELD OF THE INVENTION

This present invention relates to the at-sea operation of multiple marine vessel hullforms.

BACKGROUND OF THE INVENTION

For traditional ocean-going displacement vessels, the in-water propulsion is dominated by wave making resistance. This wave-making resistance is caused by the formation of waves following the vessel or ship known as the Kelvin wake. In 1887, Lord Kelvin showed that the wake created by an object moving at a uniform speed is always delimited by an angle 4 equal to arcsin ⅓=19.5 degrees. Two sets of waves can be distinguished in the wake: transverse waves and divergent as shown in FIG. 1.

Transverse Waves are those waves traveling roughly perpendicular to the ship's track. They can be seen extending across the otherwise relatively calm area between the sides of the wake. The transverse displacement waves are always contained within the Kelvin Wake angle and always reach its' outer boundary.

Diverging Waves are those waves traveling diagonally outwards. The divergent waves are observed as the wake of a ship with a series of diagonal or oblique crests moving at an angle to the ship's track.

The wake pattern is strongly dependent upon Froude number (Fr) where $Fr=v/(g*1)^{0.5}$ and v is the vessels speed, g acceleration due to gravity and l is the vessel's waterline length. At low Froude numbers the wave energy is dominated by the transverse waves and is spread almost uniformly from one side of the Kelvin angle to the other. As Froude number and speed increases the wave amplitude of the transverse waves decreases and the wave amplitude of the diverging waves increase, and their energy begins to concentrate towards the outer regimes of the Kelvin angle.

As illustrated in FIG. 1, the transverse wave component of the Kelvin-wake is observable as the large periodic waves within the V-pattern. A direct relationship exists between the vessel's waterline length, speed and the magnitude of the wave-making resistance. The vessels transverse wave's length, which is determined by the vessel's speed, can be expressed by $\lambda=2\pi v^2/g$ (where $\lambda$ is the transverse wave length, v is the vessel speed and g is the acceleration due to gravity) and is shown in FIG. 2. Increases in wave-making resistance, referred to as "humps" occur when the transverse waves have a crest located at the vessels bow and a trough located at the stern. As illustrated in FIG. 3, the primary hump 5, where wave-making resistance is the largest, occurs when ½ the transverse wave's length equals the vessel's length. Additional wave-making resistance humps, decreasing in magnitude 6 and 7, occur when 1½, 2½... transverse wave lengths equal the vessel's length. Troughs or sweet spots 8, where wave making resistance is lower, occur when the transverse waves have a crest at the vessel's bow and a crest at the stern or when 1, 2, ... transverse wave lengths equal the vessel's length. For a typical marine vessel length there is a rapid rise in wave-making resistance beginning at around secondary and primary hump speeds then decreasing with increasing speed. This is illustrated in FIG. 3. To attain a speed greater than the secondary and primary hump speeds marine vessels currently require a propulsion system that must account for the high-power requirement due to the wave-making resistance hump.

A previous embodiment often used to reduce wave-making resistance by altering the waves generated by the hull is the bulbous bow. However due to its fixed geometry and relatively small length and displacement when compared to the main hull its effectiveness is limited to small reductions in wave-making resistance and most importantly only occurs over a narrow range of speeds.

Another previous embodiment optimizes the marine vessel hullform's lengthwise area distribution (sometimes referred to as coke bottling) to reduce wave-making resistance. This embodiment is generally only applicable to large vessel's operation at a single design speed as the wave-making resistance increases at off-design speeds.

Another previous embodiment is referred to as the connector-less sea train (U.S. Pat. No. 8,069,806 B1) which arranges multiple vessels bow to stern in a continuous manner. The sea train vessels require a substantial V-shaped notch in the stern to permit the bow-to-stern-to bow-to stern continuous pattern. The continuous bow-to-stern arrangement is held together by compressive forces created by the vessels' propulsion systems. In this way, the multiple vessels present the appearance of an individual longer length vessel which reduces the multiple vessel configuration wave-making resistance when compared to the equivalent number of individual vessels. However, this improved efficiency does not eliminate the secondary and primary humps of the combined sea train assembly—it just pushes them out to a higher speed reflective of the longer apparent length. It also is not effective at or above hump speed. It also requires the vessels to be in contact which at higher speeds and sea states is problematic from a damage and safety standpoint. It also requires a unique vessel designed with notches to support nesting so is not appropriate for existing marine vessels without hull modifications.

Another embodiment arranges multiple vessels bow to stern in a continuous manner using mechanical means to connect the vessels. To reduce the connected vessels structural loads these mechanical connectors must provide multiple degrees of freedom of motion resulting in problematic alignment when disconnecting and reconnecting in the open-ocean seaways, maneuvering and control issues as well as the issues identified in the connector-less sea train described in [0008].

OBJECTS OF THE INVENTION

It is an object of the present invention to provide a means of operating multiple marine vessels, with substantially reduced wave-making resistance across the entire speed regime of FIGS. 2 and 3, and a resulting reduction in propulsion power and fuel used, over the vessel's entire operational speed range.

Another object of the present invention is to provide a means of operating multiple marine vessels, with increased performance including speed, and range.

Another object of the present invention is to provide a means of operating currently existing multiple marine vessels, with substantially reduced wave-making resistance, and resulting propulsion power, over the vessel's entire operational speed range without modifying the hullform (stern notches) or adding mechanical connection features to the existing vessels.

Another object of the present invention is to provide a means of operating multiple marine vessels of equal, similar or differing hullforms (length, beam, draft, displacement, monohull, catamaran, trimaran, SWATH etc.) with substantially reduced wave-making resistance.

Another object of the present invention is to eliminate the need for physical contact of the multiple vessels, thereby eliminating the "sea train" complexity and risk of damage during transit operations and also coupling operations in high sea states.

Another object of the present invention is to provide a means of operating multiple marine vessels in a significant seaway at all headings with substantially reduced wave-making resistance.

Yet another object of the present invention is to reduce the possibility of catastrophic failure and damage as could be experienced in a sea train if the lead vessel is damaged due to adversary or environment.

Yet another object of the present invention is that it is retains the maneuverability of the individual smaller-length vessels.

BRIEF DESCRIPTION OF THE INVENTION

In accordance with an aspect of the present invention two or more marine vessels are operated in a coordinated and controlled spatially separated manner along the direction of travel. By using two or more vessels creating comparable Kelvin-wake patterns a preponderance of the wave-making resistance, at vessel Froude numbers below 0.5 (hump speed), is cancelled by spatially separating the vessels at a distance where the Kelvin wakes transverse wave produced by the vessels are out of phase and destructively cancel each other. As the transverse wave length increases with speed spatial separation of the tandem vessels is also increased. At vessel Froude numbers above 0.5 (hump speed) wave-making resistance is cancelled by spatially separating the vessels at a distance where the Kelvin wakes divergent waves produced by the vessels are out of phase and destructively cancel each other. As the divergent wave length increases with speed spatial separation of the tandem vessels is also increased.

Lateral spatial separation of aft vessels permits close longitudinal vessel separations and safe operation without the potential of vessel collisions or the need for physical connections or compressive contact.

For control of spatial separation radar, GPS, LIDAR or other sensor system means, along with the Fleet vessels' employing spatial supervisory propulsion control, determines and maintains the appropriate spatial separation. Each vessel in the fleet constellation will be equipped with a Spatial Controller with the Lead Vessel's Spatial Controller being operated as the Master Controller and the remaining fleet "Follower" vessels being operated as Slave Controllers. "Follower" vessels can change position within the fleet to become the "Lead" Vessel to evenly distribute the propulsive workload and balance asymmetric fuel consumption among the fleet vessels. Each vessel Spatial Controller system will read a set of status information (propulsion status, rudder control surface, inertial data, relative vessel spatial position and sea-wave forecast information) and utilize that to maintain/update a model of the coordinated vessel fleet. Information from each of the vessels will be used by the Vessel Coordination Layer on the lead vessel. The Vessel Coordination Layer will then use the relative position of the vessels to compute the propulsion thrust and rudder outputs for each vessel. Relative positioning of Fleet vessels is an important input to the system controller that will determine the output (thrust, rudder control surface) of each power plant/rudder system in order for the fleet to move in unison through the water. Control information for the trail vessel(s) will be communicated across a radio link, and that output will be coordinated with the vessel control system. A wave sensing tool can be used to sense the seaway's predominant energy wave length. This predictive tool will be used in conjunction with a control algorithm to adjust the fleets speed, course and vessels spatial positioning for seaway wave encounters, maintaining vessels spatial positioning with minimal propulsion control and to determine when the fleet of vessels needs to break formation for safety reasons.

BRIEF DESCRIPTION OF THE DRAWINGS

FIG. 1 shows plan and elevation views of a marine vessel (amphibious vehicle shown as an example) and its Kelvin wake while traveling at the primary hump speed. Transverse waves are those waves traveling roughly perpendicular to the vessel's track where the solid lines 1 depicts the transverse wave troughs, the dashed lines 2 the wave crests and 3 the transverse wave length. Divergent waves are those waves traveling diagonally outwards. At low Froude numbers the wave energy is dominated by the transverse waves and is spread almost uniformly from one side of the Kelvin angle 4 to the other. As Froude number and speed increases the wave amplitude of the transverse waves decreases and the wave amplitude of the diverging waves increase, and their energy begins to concentrate towards the outer regimes of the Kelvin angle.

FIG. 2 shows the Kelvin wake's transverse wave length vs. speed where the transverse wave length $\lambda = 2\pi v^2/g$ (where $\lambda$ is the transverse wave length, v is the vessel speed and g is the acceleration due to gravity).

FIG. 3 shows the wave-making resistance vs. speed for a marine vessel (amphibious vehicle shown as an example). Traditional marine vessels have large hydrodynamic resistance dominated by wave-making at "hump" speeds. The majority of vessel wave-making resistance is in the Kelvin wake's transverse-wave field component which results in peaks (significantly higher power requirements) when the transverse wave lengths are 0.67 times (1½ $\lambda$) 6 and 2 times (½ $\lambda$) 5 the craft length (known as the secondary and primary humps). Wave-making resistance is lowest when the transverse wave length ($\lambda$) equals the vessel length 8.

FIG. 4 is an elevation view showing the transverse wave for a single marine vessel 38 operating at hump speed, (as shown as FIG. 3 location 5), where the transverse wave length 42 is 2 times the vessels length 41. Also shown is a single marine vessel 39 operating at its "sweet spot" speed, (as shown as FIG. 3 location 8), where the transverse wave length and the vessel's length are equal 43. (Amphibious vehicle shown for example).

FIG. 5 is an elevation view showing the transverse waves and wave cancellation 46 for tandem amphibious marine vehicles where the aft vehicle 48 and its transverse wave 45 is positioned to destructively cancel the transverse wave 44 of the lead vehicle 47. Tandem vehicle positions are depicted for transverse wave cancellation at the primary hump speed 40 and for the "sweet spot" 49 speed (11 kts 40 and 6.5 kts 49 respectively for a 35 ft waterline length vehicle).

FIG. 6 shows wave-making resistance vs. speed for a single 41 and for tandem 42 amphibious marine vehicles. The tandem vehicles operating at optimal spatial separation distances illustrates the transverse wave cancellation is effective below, thru and above the vehicles' hump speed. Below the primary hump vehicles are closely spaced and at a speeds higher than hump speed where the vehicle's transverse wave is longer the vehicles are therefore spatially separated at greater distances. (Amphibious vehicles performance shown for illustration.)

FIG. 7 shows a notional 130 ft Length Over All (LOA) trimaran geometry that will be used as an illustrative example of a marine vessel. It is important to note the destructive wave cancelation described is independent of hull form type.

FIG. 8 shows a profile (elevation) and plan view depicting the transverse Kelvin wake for the trimaran hullform of FIG. 7 traveling at a 16 kt speed. Transverse wave crests and troughs are depicted as dark and light shades respectively.

FIG. 9 is the wave-making resistance vs speed for a single trimaran as shown in FIG. 7.

FIG. 10 shows a plan view of two notional 130 ft trimaran marine vessels in a tandem fleet formation. The spatial separation is defined by the longitudinal bow to bow separation distance and the lateral vessel centerline to vessel centerline separation distance.

FIG. 11 shows the effect on wave-making resistance of longitudinal spatial separation for two tandem trimaran vessels of FIG. 10 as compared to a single trimaran vessel at a 16 kt vessel speed. The average wave-making resistance for the 2 vessel arrangement is shown as the dashed line 13. Wave-making resistance for a single vessel is shown as the solid line 12. Lateral separation of the vessels is fixed at 60 ft.

FIG. 12 shows the effect on wave-making resistance of lateral spatial separation for two trimaran vessels of FIG. 10 as compared to a single trimaran vessel at a 16 kt vessel speed. The average wave-making resistance for the 2 vessel arrangement is shown as the dashed line 10. Wave-making resistance for a single vessel is shown as the solid line 11. Longitudinal separation of the vessels is fixed at 350 ft. Note that the reduction in wave-making resistance is not highly dependent on the following vessel's lateral location. This effect occurs at Froude numbers and speeds below hump where the following vessel is located in the transverse wave field.

FIG. 13 shows the effect on wave-making resistance of longitudinal spatial separation for two tandem trimaran vessels of FIG. 10 as compared to a single trimaran vessel at a 25 kt vessel speed. The average wave-making resistance for the 2 vessel arrangement is shown as the dashed line 17. Wave-making resistance for a single vessel is shown as the solid line 16. Lateral separation of the vessels is fixed at 130 ft.

FIG. 14 shows the effect on wave-making resistance of lateral spatial separation for two trimaran vessels of FIG. 10 as compared to a single trimaran vessel at a 25 kt vessel speed. The average wave-making resistance for the 2 vessel arrangement is shown as the dashed line 15. Wave-making resistance for a single vessel is shown as the solid line 14. Longitudinal separation of the vessels is fixed at 500 ft. Note that the largest reduction in wave-making resistance occurs when the following vessel's lateral location is aligned with the Kelvin wakes divergent waves. This effect occurs at Froude numbers and speeds above the hump speed.

FIG. 15 is a visual representation of the Kelvin wake transverse wave cancellation and resultant wave-making resistance reduction for the two trimaran vessels operating at 16 kts with optimal 60 foot lateral and 350 foot longitudinal spatial separation as depicted in FIGS. 11 and 12 respectively.

FIG. 16 is a visual representation showing three trimaran vessels that are spatially positioned to cancel the transverse Kelvin waves at 16 kts.

FIG. 17 is a visual representation of 4 vessel fleet formation operating at 16 kts illustrating the Kelvin wake transverse wave cancellation and the resultant reduction in wave-making resistance.

FIG. 18 compares the wave-making resistance for a: 2 vessel 21, 3 vessel 22 and 4 vessel 23 fleet, when spatially optimized at 16 and 25 kts, to a single vessel's wave-making resistance 20. Wave-making resistance for the 2, 3 and 4 fleet vessels is an average of all the vessels.

FIG. 19 is a visual representation of a 2 vessel fleet formation operating at 16 kts where the following vessel is longitudinally spaced at 2½ transverse wave lengths illustrating the Kelvin wake transverse wave cancellation and the resultant reduction in wave-making resistance. (Note, FIG. 15 is a visual representation at 1½ transverse wavelengths.)

FIG. 20 compares the wave-making resistance for two, 2 vessel fleets with one of the 2 vessel fleet's longitudinal spacing at 1½ transverse waves 33 and the other 2 vessel fleet's longitudinal spacing at 2½ transverse waves 32 to the wave-making resistance of a single vessel 31. Note there is little difference in the wave-making resistance for the vessels at the longitudinal spacing of 1½ and 2½ transverse waves.

FIG. 21 shows seaway spectral energy distribution and the predominant wave lengths and celerity speeds at the wave period where the maximum sea state energy occurs 50. For Sea States 2 thru 6 the predominant energy wave lengths and wave celerity speeds are 55 ft. and 10 kts. 55; 125 ft. and 15 kts. 54; 225 ft. and 20 kts 53; 350 ft. and 25 kts 52; and 500 ft. and 30 kts. 51.

FIG. 22 depicts a 3 vessel fleet comprised of 130 ft. trimarans operating at 16 kts in sea state 3 in a head (or following) seaway. The Sea State 3 seaways predominant energy wave length (approximately 200 ft) is shown. The vessels are longitudinally spaced at 1½ transverse waves for cancellation of the Kelvin wake's transverse waves to minimize wave-making resistance. At this spatial separation the lead and following vessels are also in phase (at a seaway 2 wave length spacing) with the highest energy seaway waves. By being in phase with the seaway surging motion of the vessels are also in phase minimizing the change in longitudinal spatial separation.

FIG. 23 depicts a 3 vessel fleet comprised of 130 ft. trimarans operating at 16 kts in sea state 3 at a heading of 20 or 200 degrees to the seaway. The two following vessels are spatially positioned at 1½ & 2½ transverse waves aft of the lead vessel. This spatial positioning cancels the Kelvin wake's transverse waves while aligning the vessels to be in phase with the seaway predominant energy wave length (at 2 and 3 wave lengths spacing) as shown. By being in phase with the seaway surging motion of the vessels are also in phase minimizing the change in longitudinal spatial separation.

FIG. 24 shows a 3 vessel fleet comprised of 130 ft. trimarans operating at 16 kts, in sea state 3, in bow or stern quartering seas. The seaway predominant energy wave length is shown. The two following vessels are spatially positioned at 1½ & 2½ transverse waves aft of the lead vessel. This spatial positioning cancels the Kelvin wake's transverse waves while aligning the vessels to be in phase with the seaway predominant energy wave length (at a 2 wave length spacing) as shown. By being in phase with the seaway surging motion of the vessels are also in phase minimizing the change in longitudinal spatial separation.

FIG. 25 depicts a 3 vessel fleet comprised of 130 ft. trimarans operating in sea state 4+ at 16 kts in a head (or following) seaway. The seaway predominant energy wave length (approximately 350 ft.) is shown. The two following vessels are spatially positioned at 1½ transverse waves aft of the lead vessel. This spatial positioning cancels the Kelvin wake's transverse waves while aligning the vessels to be in phase with the seaway predominant energy wave length (at a single wave length spacing) as shown. By being in phase with the seaway surging motion of the vessels are also in phase minimizing the change in longitudinal spatial separation.

FIG. 26 depicts a 3 vessel fleet operating at 16 kts in sea state 4+ in bow or stern quartering seas. The seaway predominant energy wave length (approximately 350 ft.) is shown. The two following vessels are spatially positioned at 1½ & 2½ transverse waves aft of the lead vessel. This spatial positioning cancels the Kelvin wake's transverse waves while aligning the vessels to be in phase with the seaway predominant energy wave length (at a single wave length spacing) as shown. By being in phase with the seaway surging motion of the vessels are also in phase minimizing the change in longitudinal spatial separation.

DETAILED DESCRIPTION OF THE INVENTION

The subject invention is comprised of:

Two or more marine vessels where each vessel has a modular supervisory spatial positioning, propulsion and maneuvering controller with supporting spatial sensors and communication system to control the marine vessels spacing distance and therein cancel the combined Kelvin transverse or diverging wake field to reduce the vessels wave-making resistance.

Referring now to the drawings in detail, the subject invention reduces the wave-making resistance of marine vessels by up to 75% by operating them in a controlled and spatially coordinated pattern to destructively cancel their transverse wave system (shown in FIGS. 15, 16 and 17). Through active control of their separation distance the wave-making resistance reduction is optimized over the entire range of operational speeds (shown in FIGS. 6 and 18). The subject invention consists of intelligent, supervisory propulsion and maneuvering controller modules with appropriate sensors to measure and control the marine vessels spatial separations and to reduce their in-water propulsion requirements. Additionally the supervisory propulsion controller module of our invention optimizes the vessels spatial separation for seaway sea state conditions by sensing the seaway's predominant energy wave length and adjusting the fleet vessels speed and spatial arrangement as shown in FIGS. 22, 23, 24, 25 and 26. These capabilities enable improvement in the marine vessels' ship-to shore mobility (speed, payload and range), improve survivability and reliability and reduce acquisition and total ownership cost.

The invention minimizes the marine vessel's current limiting hydrodynamic "hump" speeds by reducing the wave-making resistance by means of canceling each vessel's transverse wave or divergent wave. For two marine vessels, wave cancelation is maximized at all speeds by adaptively changing the vessel spatial separation with speed as shown in FIGS. 4, 5 and 6. The effect of longitudinal and lateral spacing as defined in FIG. 10, on the reduction in wave-making resistance for two 130 ft trimaran marine vessels (FIG. 7) is shown in FIGS. 11 and 12 at a 16 kt speed and FIGS. 13 and 14 for a 25 kt speed. At 16 kts a change in longitudinal spacing of ±15 ft. from the optimal 345 ft spacing has a minimal effect on the reduction in wave-making resistance as shown in FIG. 11. The effect of lateral spacing on the reduction in wave-making resistance at a 16 kt speed is negligible for lateral a positioning of 0 ft. (aligned with lead vessel) up to a 100 ft. lateral offset distance. At 25 kts a ±25 ft deviation from the 510 ft optimal longitudinal spacing has only a small effect of on the reduction in wave-making resistance as shown in FIG. 13. The lateral position of the following vessel at 25 kts is along the diverging Kelvin waves. A deviation of between +15 ft from the optimal position of 130 ft has only a small effect of on the reduction in wave-making resistance as shown in FIG. 14. These positioning tolerances permit a sufficient time for the vessels' Spatial Controllers and vessels' propulsion and maneuvering systems to accommodate and respond to seaway induced lateral, longitudinal and directional motions.

Note however, the subject invention also works for an additional number of marine vessels. FIG. 18 shows the vessel average wave-making resistance for 2, 3 and 4 vessel fleets at 16 and 25 kts compared to a single vessel's wave-making resistance. Vessel formations and depictions of the Kelvin wake transverse wave cancellation for the 2, 3 and 4 vessel fleets at 16 kts are shown in FIGS. 15, 16 and 17. Additional vessels (5, 6 or more) will also achieve similar wave-making resistance reduction when positioned aft of vessel 4 at the appropriate transverse wave longitudinal and lateral positions.

The subject invention is also appropriate for fleets consisting of vessels of differing configurations such as type of hullform, length or displacement (as opposed to identical vessels). As the Kelvin wakes transverse and divergent wave length are only dependent on the vessel's speed the fleet vessel's longitudinal and lateral spatial separation would be the same for vessels of identical or differing configurations.

Concept of Operation: The invention is engaged by the lead vessel supervisory controller (and/or coxswain if manned) for multiple vessel reduced resistance operation in-water mobility. Radar and/or a differential GPS-based location system or equivalent sensor system is used to provide extremely accurate relative positions of the vessels separation distances. Relative positioning information of the two or more vessels is provided to the supervisory propulsion and maneuvering controller to direct the vessels' propulsion and maneuvering systems to maintain required vessels separation for Kelvin wake wave cancelation. For unmanned vessels, the supervisory controller is embedded in the mission planning and vessel control autonomy. For manned vessels operation, the invention does not operate with complete autonomy; the objective being to enhance the multiple vessels coxswains' ability to operate the vessel more efficiently. The invention is packaged to support initial or retrofit integration into marine vessels. For a commanded speed of advance, the invention adjusts the marine vessels' propulsion and maneuvering systems to automatically maintain the required separation distance between the vessels to destructively cancel the wave-making resistance of the multiple vessels. Additionally, the control system can adjust the vessels' speed and spatial positions to align the vessels to be in phase with the seaway predominant energy wave length minimizing the propulsion control response. The system has multiple redundancies and sensors to ensure sufficient safe vessel stand-off distance is maintained and will adjust for sea state. Additionally, the control system can sense and monitor each vessel's propulsion and maneuvering system health and fuel usage and reposition vessels within the fleet to evenly distribute propulsion and maneuvering system duty cycle usage and fuel usage. For example, changing positions with the lead vessel which has larger resistance and greater propulsion and fuel usage with one of the aft vessels which have less resistance and less propulsion and fuel usage.

While the present invention as described herein with reference to particular embodiment shown in the drawings, it is to be understood that various changes and modifications may be affected therein by those skilled in the art without departing from the scope or spirit of this invention.

What is claimed is:

1. A system for operating two or more marine vessels in controlled spatial relation to reduce wave-making resistance, the system comprising:
   at least one sensor configured to gather information including position and speed of at least one lead vessel of the two or more marine vessels; and
   at least one controller configured to:
   (i) read the information from the at least one sensor including a position reading associated with the position of the at least one lead vessel, and a speed reading associated with the speed of the at least one lead vessel;
   (ii) based at least upon the speed reading, determine at least one wave pattern of a Kelvin wake of the at least one lead vessel;
   (iii) based at least upon the position reading and the determined at least one wave pattern of the at least one lead vessel, determine at least one region within the Kelvin wake of the at least one lead vessel at which to position at least one following vessel so that the at least one wave pattern of the Kelvin wake of the at least one lead vessel will at least partially destructively cancel at least one wave pattern of a Kelvin wake of the at least one following vessel, and
   (iv) output information associated with the determined at least one region for enabling positioning the at least one following vessel relative to the at least one lead vessel to thereby enable a reduction in the wave-making resistance of the at least one following vessel.

2. The system according to claim 1, wherein the at least one controller is configured to determine where to position the at least one following vessel relative to the at least one lead vessel such that crests of the at least one wave pattern of the Kelvin wake of the at least one lead vessel are aligned with troughs of the at least one wave pattern of the Kelvin wake of the at least one following vessel, and such that troughs of the at least one wave pattern of the Kelvin wake of the at least one lead vessel are aligned with crests of the at least one wave pattern of the Kelvin wake of the at least one following vessel.

3. The system according to claim 2, wherein the at least one controller is configured to determine where to position the at least one following vessel relative to the at least one lead vessel such that a bow of the at least one following vessel is located at the troughs generated by the at least one lead vessel as the at least one following vessel trails behind the at least one lead vessel at the same speed.

4. The system according to claim 1, wherein the at least one controller is configured to determine where to position the at least one following vessel relative to the at least one lead vessel by determining the at least one wave pattern of the Kelvin wake of the at least one following vessel, wherein the determining the at least one wave pattern of the Kelvin wake of the at least one following vessel is based at least partially upon the at least one following vessel travelling at the same speed as the at least one lead vessel to maintain a spatial separation therebetween.

5. The system according to claim 1, wherein the destructive cancellation provided by the at least one lead vessel includes at least partially cancelling a transverse wave pattern of the Kelvin wake of the at least one following vessel, at least partially cancelling a diverging wave pattern of the Kelvin wake of the at least one following vessel, or a combination thereof.

6. The system according to claim 1,
   wherein the at least one controller is configured to determine a Froude number of the at least one lead vessel based at least upon the speed and a waterline length of the at least one lead vessel, and
   wherein the at least one controller is configured to determine where to position the at least one following vessel relative to the at least one lead vessel based at least partially upon the Froude number of the at least one lead vessel.

7. The system according to claim 6, wherein:
   when the determined Froude number of the at least one lead vessel is less than 0.5, the at least one controller is configured to determine both an optimal longitudinal and lateral separation between a bow of the at least one lead vessel and a bow of the at least one following vessel to provide predominantly destructive cancellation of a transverse wave pattern of the Kelvin wake of the at least one following vessel, and/or
   when the determined Froude number of the at least one lead vessel is greater than 0.5, the at least one controller is configured to determine an optimal longitudinal and lateral separation between the bow of the at least one lead vessel and the bow of the at least one following vessel to provide predominantly destructive cancellation of the diverging wave pattern of the Kelvin wake of the at least one following vessel.

8. The system according to claim 7, wherein the at least one controller is configured to determine where to position the at least one following vessel relative to the at least one lead vessel to reduce the wave-making resistance of the at least one following vessel by up to 75%.

9. The system according to claim 1, wherein the at least one controller is configured to monitor fuel consumption of the at least one lead vessel and/or the at least one following vessel.

10. The system according to claim 9, wherein the at least one controller is configured to determine when to swap positions between the at least one lead vessel and the at least one following vessel to distribute fuel usage more evenly between the at least one lead vessel and the at least one following vessel.

11. The system according to claim 1, wherein the at least one controller is configured to determine the respective wave patterns of the respective Kelvin wakes of a plurality of following vessels, and is configured to determine where to position each of the plurality of following vessels with respect to the at least one lead vessel and with respect to each other to thereby minimize wave-making resistance of each of the plurality of following vessels.

12. The system according to claim 1, wherein the at least one sensor includes one or more of radar, LIDAR, and GPS, and/or one or more sensors configured to detect propulsion thrust, rudder control surface, or inertia of the at least one lead vessel and/or the at least one following vessel.

13. The system according to claim 1, wherein the information output from the at least one controller is input into a model simulation for use to control the at least one following vessel automatically or by manned control.

14. A constellation, comprising:
two or more marine vessels, including at least one lead vessel and at least one following vessel, and
the system according to claim 1.

15. The constellation according to claim 14, wherein the at least one lead vessel is not located in a Kelvin wake of another vessel, and wherein the at least one following vessel includes a plurality of following vessels, wherein each of the plurality of following vessels is located in a Kelvin wake of the lead vessel and/or in respective Kelvin wakes of others of the plurality of following vessels.

16. The constellation according to claim 14,
wherein the at least one following vessel includes a plurality of following vessels, including a first set of one or more following vessels at a first longitudinal distance from the at least one lead vessel, and a second set of one or more following vessels at a second longitudinal distance from the at least one lead vessel, wherein the second longitudinal distance is greater than the first longitudinal distance such that the second set of one or more following vessels is behind the first set, and
wherein the at least one controller is configured to determine the respective wave patterns of the respective Kelvin wakes of the plurality of following vessels, and is configured to determine where to position each of the plurality of following vessels with respect to the at least one lead vessel and with respect to each other to thereby minimize wave-making resistance of each of the plurality of following vessels.

17. The constellation according to claim 14, wherein the at least one lead vessel and the at least one following vessel have different hullforms.

18. The constellation according to claim 14, wherein each of the at least one lead vessel and/or each of the at least one following vessel includes a corresponding controller of the at least one controller.

19. A method of operating two or more marine vessels in controlled spatial relation to reduce wave-making resistance, the method comprising:
determining a position and speed of at least one lead vessel of the two more marine vessels;
(ii) based at least upon the determined speed of the at least one lead vessel, determining at least one wave pattern of a Kelvin wake of the at least one lead vessel;
(iii) based at least upon the determined position and the determined at least one wave pattern of the at least one lead vessel, determining at least one region within the Kelvin wake of the at least one lead vessel at which to position at least one following vessel so that the at least one wave pattern of the Kelvin wake of the at least one lead vessel will at least partially destructively cancel at least one wave pattern of a Kelvin wake of the at least one following vessel; and
(iv) positioning the at least one following vessel in the determined at least one region relative to the at least one lead vessel, thereby reducing the wave-making resistance of the at least one following vessel.

20. The method according to claim 11, wherein the positioning the at least one following vessel includes setting a speed of the at least one following vessel to the speed of the at least one lead vessel to thereby maintain a separation distance therebetween.

* * * * *